(12) United States Patent
Ebihara et al.

(10) Patent No.: US 7,549,176 B2
(45) Date of Patent: Jun. 16, 2009

(54) RECORDING MEDIUM, INFORMATION PLAYBACK APPARATUS AND METHOD, AND INFORMATION RECORDING AND PLAYBACK APPARATUS

(75) Inventors: Munetake Ebihara, Kanagawa (JP); Takamichi Hayashi, Tokyo (JP); Mitsuru Katsumata, Tokyo (JP); Hiroyuki Ichikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 10/887,818

(22) Filed: Jul. 12, 2004

(65) Prior Publication Data

US 2005/0055314 A1      Mar. 10, 2005

(30) Foreign Application Priority Data

Jul. 14, 2003    (JP)  ............................... 2003-274301

(51) Int. Cl.
G06F 7/04 (2006.01)
G11B 19/02 (2006.01)

(52) U.S. Cl. ...................................... 726/32; 369/47.12
(58) Field of Classification Search .................... 726/32
See application file for complete search history.

(56) References Cited

U.S. PATENT DOCUMENTS

2003/0012098 A1* 1/2003 Sako et al. ............... 369/47.12

FOREIGN PATENT DOCUMENTS

| EP | 0 942 418 A1 | 9/1999 |
|---|---|---|
| EP | 0 984 346 A1 | 3/2000 |
| EP | 1 045 387 A1 | 10/2000 |
| EP | 1 187 111 A1 | 3/2002 |
| EP | 1 288 948 A1 | 3/2003 |
| JP | 11-312364 | 11/1999 |
| JP | 2002-42413 | 2/2002 |
| JP | 2002-290395 | 10/2002 |
| JP | 2003-008567 | 1/2003 |
| JP | 2003-143548 | 5/2003 |
| WO | WO 01/88922 A1 | 11/2001 |

* cited by examiner

*Primary Examiner*—Brandon S Hoffman
(74) *Attorney, Agent, or Firm*—Oblon, Spivak, McClelland, Maier & Neustadt, P.C.

(57) ABSTRACT

In a CD-DA, encoded content in which audio information is encoded using a content key, the content key, and two usage right files are recorded in predetermined regions. The usage right files are a CD-DA usage right file having CD-DA usage rights, and a CD-R usage right file having CD-R usage rights. The usage rights recorded in the CD-DA usage right file regulate the usage on a CD-DA.

13 Claims, 13 Drawing Sheets

RECORDING MEDIUM, INFORMATION PLAYBACK APPARATUS AND METHOD, AND INFORMATION RECORDING AND PLAYBACK APPARATUS

BACKGROUND OF THE INVENTION

1. Field of the Invention

The present invention relates to a recording medium from or onto which information, such as audio and/or video and data, can be played back or recorded with copyright management. The present invention further relates to an information playback apparatus that plays back information from a recording medium while managing the copyright, and to an information recording and playback apparatus that plays back information from a recording medium and that records information to a recordable recording medium. The present invention further relates to an information playback method for playing back information from a recording medium while managing the copyright.

2. Description of the Related Art

Recently, recording media onto and/or from which digital information, such as audio and/or video and data, can be recorded and/or played back have been commercially available, such as optical discs including magneto-optical discs, hard disks (HDs), and semiconductor memories.

There are several types of optical discs, for example, a compact disc (CD) in which information, such as audio and/or video and data, is formed with pits, a magneto-optical disc in which binary data is represented by the direction of magnetization, and so forth.

A variety of CD format discs belonging to the so-called CD family, such as CD-DA (compact disc-digital audio), CD-ROM (compact disc read-only memory), CD-R (CD-recordable), CD-RW (CD-rewritable), and CD-TEXT, have been developed and become widespread. CD-DA and CD-ROM discs are playback-only media, CD-R discs are write-once media having a recording layer made of organic dye, and CD-RW discs are data rewritable media using phase change technology.

Magneto-optical discs include so-called rewritable Mini-Discs (MDs) having a diameter of 64 mm, discs having a diameter of 130 mm, and so on.

For example, if audio information recorded in a CD-DA is duplicated (copied) to a recordable disc such as a CD-R, a CD-RW, or an MD, the quality of the duplication is substantially not lowered because it is digital data, and the duplicated audio information has the same quality as that of the original audio information. Thus, the copyright of the original audio information is violated. The same applies to other recording media, such as HDs and semiconductor memories. Such a problem has not been overcome in the related art.

However, it is often inconvenient that users are prohibited from copying CD-DA audio information to a disc such as a CD-R or an MD. In some cases, users usually want to play back audio information from a CD-R or an MD while preserving the original CD-DA information for use in the event that such a disc is damaged or lost. What is essential is that users should not illegally profit by marketing multiple copies of discs and the copyright should not be violated.

SUMMARY OF THE INVENTION

Accordingly, it is an object of the present invention to provide a recording medium that can be used under copyright management control by a user without being inconvenienced. It is another object of the present invention to provide an information playback apparatus and method, and an information recording and playback apparatus.

In one aspect of the present invention, a recording medium includes an encoding key, encoded information that is encoded using the encoding key, and usage right files separately having usage rights for at least two media. The encoding key, the encoded information, and the usage right files are recorded in predetermined regions of the recording medium.

The type of medium may be determined based on a physical difference between the at least two media, and operations under copyright management control may be performed in accordance with the usage right of the determined medium.

In another aspect of the present invention, an information playback apparatus plays back information from a recording medium that includes information and usage right files separately having usage rights for at least two media, wherein the information and the usage right files are recorded in predetermined regions of the recording medium. The information playback apparatus includes a characteristic identifier that extracts characteristics of the at least two media, a controller that determines the type of medium based on the characteristics extracted by the characteristic identifier and that generates a control signal for the usage right file corresponding to the determined medium, and an information processor that processes the information based on the control signal generated by the controller.

The controller can determine the type of medium based on the characteristics extracted by the characteristic identifier, and can perform operations under copyright management control on the determined medium.

In still another aspect of the present invention, an information playback method for playing back information from a recording medium that includes information and usage right files separately having usage rights for at least two media, wherein the information and the usage right files are recorded in predetermined regions of the recording medium includes a characteristic identifying step of extracting characteristics of the at least two media, a controlling step of determining the type of medium based on the characteristics extracted in the characteristic identifying step and generating a control signal for the usage right file corresponding to the determined medium, and an information processing step of processing the information based on the control signal generated in the controlling step.

In the controlling step, the type of medium can be determined based on the characteristics extracted in the characteristic identifying step, and operations under copyright management control can be performed on the determined medium.

In still another aspect of the present invention, an information recording and playback apparatus plays back information from a recording medium that includes information and usage right files separately having usage rights for at least two media, wherein the information and the usage right files are recorded in predetermined regions of the recording medium, and records information to another recording medium. The information recording and playback apparatus includes a characteristic identifier that extracts characteristics of the at least two media, a controller that determines the type of medium based on the characteristics extracted by the characteristic identifier and that generates a control signal for the usage right file corresponding to the determined medium, and an information processor that plays back the information and records information to another recording medium based on the control signal generated by the controller.

The controller can determine the type of medium based on the characteristics extracted by the characteristic identifier, and can perform operations under copyright management control on the determined medium.

According to the present invention, therefore, the recording medium can be used under copyright management control by a user without being inconvenienced.

Moreover, according to the present invention, the information playback apparatus can play back information from a recording medium under copyright management control without inconveniencing the user.

Moreover, according to the present invention, the information recording and playback apparatus can play back information from a recording medium and can record information recorded in a recording medium to another recording medium under copyright management control without inconveniencing the user.

Moreover, according to the present invention, the information playback method can play back information from a recording medium under copyright management control without inconveniencing the user.

DESCRIPTION OF THE PREFERRED EMBODIMENTS

A recording medium, an information playback apparatus and method, and an information recording and playback apparatus according to the present invention will be described in conjunction with preferred embodiments with reference to the drawings.

First Embodiment

Figure 1:
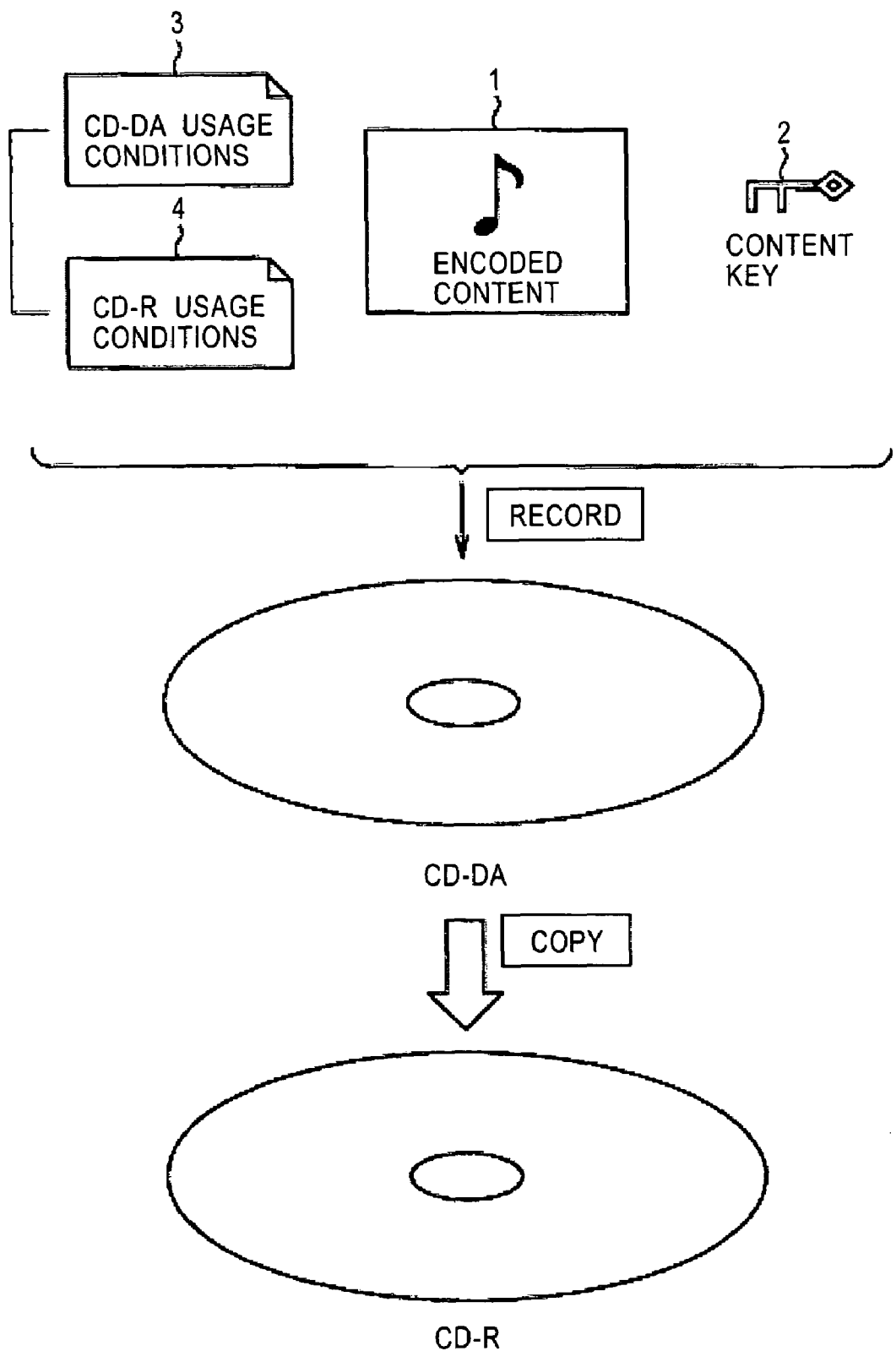
FIG. 1 is a schematic diagram of a CD-DA and CD-R according to a first embodiment of the present invention.

FIG. 1 illustrates a CD-DA and CD-R according to a first embodiment of the present invention. The CD-DA contains original audio information, and the CD-R contains a duplication (copy) of the original audio information on the CD-DA. As shown in FIG. 1, the CD-DA contains encoded content 1 and a content key 2. The encoded content 1 is content in which audio information is encoded using the content key 2. The CD-DA further contains two usage right files, i.e., a CD-DA usage right file 3 having CD-DA usage rights and a CD-R usage right file 4 having CD-R usage rights. The encoded content 1, the content key 2, and the usage right files 3 and 4 are recorded in predetermined regions of the CD-DA.

The usage rights recorded in the CD-DA usage right file 3 regulate the usage on a CD-DA. For example, the user is allowed to play back the content and to copy the content one time. The usage rights recorded in the CD-R usage right file 4 regulate the usage on a CD-R. For example, the user is allowed to only play back the content, but is not allowed to copy the content. The usage rights are equipped with a digital signature having a public key in order to check for tampering. Alternatively, the usage rights may be equipped with a message authentication code (MAC) having a shared secret key. Specific examples of the usage right files 3 and 4 are described below.

Since the content data 1 has been encoded using the content key 2, the content key 2 is necessary for a playback device to decode the encoded content data 1. The content key 2 is secretly hidden or is also encoded by a key (global secret key) that is shared with the playback device.

Specific examples of usage rights will now be described. The usage rights include, for example, a content ID (CID), "Media Categories for Copy" (categories of copiable media), "Copy Out Max Count" (the maximum number of times the content can be copied), "Media Categories for Check Out" (categories of checkoutable media), and "Check Out Max Count" (the maximum number of times the content can be checked out). The usage rights also include "AT3CD Burn Max Count" (the maximum number of times the content can be duplicated to other media by the Adaptive Transform Acoustic Coding 3 (ATRAC3) technique), the absolute start time ("start_time"), the absolute end time ("end_time"), and the relative period time ("period_time").

The content ID is an identification code indicating what content corresponds to this usage right file. The same ID, that is, the identification code indicating which right file corresponds to this content, is also recorded in the content file.

The "Media Categories for Copy" determines the devices to which the content can be copied.

The "Copy Out Max Count" indicates the maximum number of times the content can be copied to a medium permitted by the "Media Categories for Copy." The "Copy Out Max Count" is set to 0 or more. For example, if copying is not permitted, the "Copy Out Max Count" is set to 0.

The "Media Categories for Check Out" determines the devices to which the content can be checked out. Content checkout means transferring the content from a CD player to another portable device (PD).

The "Check Out Max Count" indicates the maximum number of times the content can be checked out to a portable device permitted by the "Media Categories for Check Out".

The "AT3CD Burn Max Count" indicates the maximum number of times the content can be duplicated to a medium by the ATRAC3 codec.

The "start_time" indicates the absolute start time at which the content can be used, and the "end_time" indicates the absolute end time at which the content can be used. The absolute period of time during which the content can be used is specified by the "start_time" and the "end_time".

The "period_time" (relative period of time) indicates the duration for which the content can be used from a given time.

For example, in the CD-DA usage right file 3 shown in FIG. 1, it is assumed that a CD-R is specified by the "Media Categories for Copy", and the "Copy Max Count" is set to 2. In the CD-R usage right file 4, it is assumed that no medium is specified by the "Media Categories for Copy" or the "Copy Max Count" is set to 0. In this case, on a CD-R containing a duplication of all CD-DA data, only playback of the data is permitted and copying to other media is not permitted.

Furthermore, for example, in the CD-DA usage right file 3, a semi-permanent period of time may be specified using the "start_time" and the "end_time" in order to achieve substantially permanent playback. In the CD-R usage right file 4, the playback-allowed period of time may be set to, for example, one month using the "start_time" and the "end_time". In this case, on a CD-R containing a duplication of all CD-DA data, the data can be used for one month.

A CD-DA is a playback-only disc, like a CD-ROM. Audio information is recorded in a CD-DA on the CD manufacturing side. In the first embodiment, the encoded content 1, the content key 2, and the two usage right files 3 and 4 are recorded with embossed pits in predetermined regions of the CD-DA on the CD manufacturing side.

A CD or compact disc typically has a single spiral recording track that starts from the center (inner periphery) of the disc and that ends with the edge (outer periphery) of the disc. In a disc onto which a user is allowed to record data, such as a CD-R or CD-RW, only a guiding groove for guiding laser light is formed in a substrate as a recording track before data recording. When laser light for modulating data with high power is irradiated onto this disc, a reflectance change or phase change of the recording layer occurs, thereby recording data onto the disc. Playback-only discs, such as CD-DAs and CD-ROMs, have no physical groove that is used as a recording track.

CD-Rs have a recording layer capable of one-time recording. The recording layer is made of organic dye, and is perforated with a high power laser for recording. CD-RWs have a recording layer capable of multiple rewriting. The recording method of CD-RWs is phase change recording in which data is recorded using the difference in reflectance between the crystal state and the amorphous state. Playback-only CDs and CD-Rs have a reflectance of 0.7 or more, and CD-RWs have a reflectance of about 0.2. CD-RWs cannot be played back on a player that is designed for a reflectance of 0.7 or more. Thus, a CD-RW is subjected to auto gain control (AGC) for amplifying a weak signal before it is played back.

Figure 2:
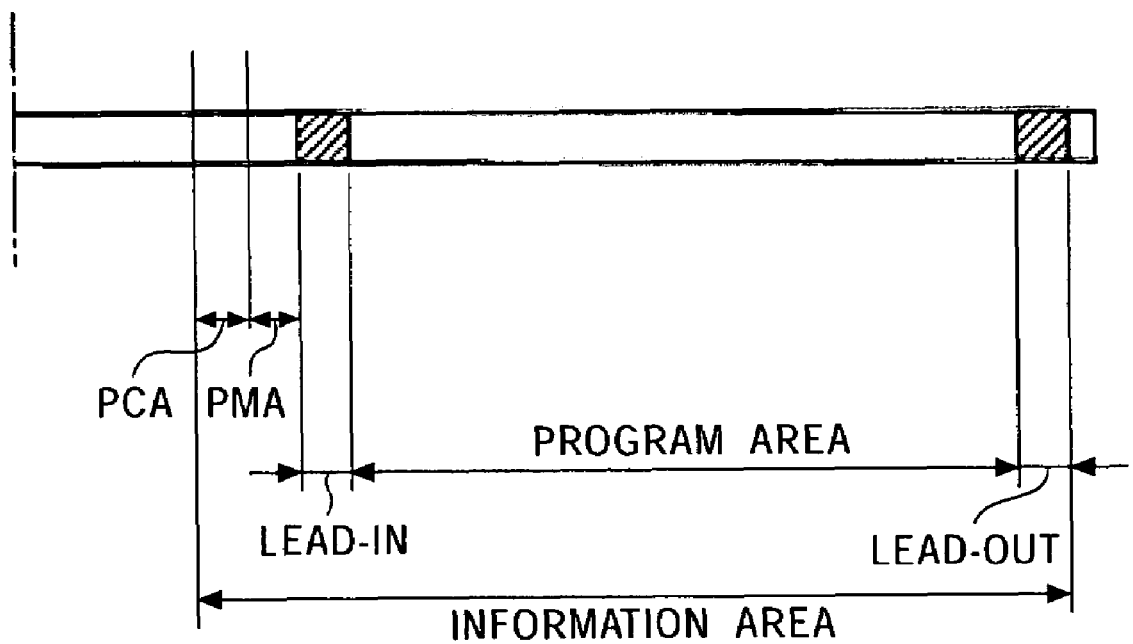
FIG. 2 is a format diagram of a CD-R and CD-RW.

In a CD-DA and CD-ROM, the lead-in area on the inner periphery side of the disc spans from a radius of 46 mm to 50 mm, and no pits exist in the area further towards the center than the lead-in area. In a CD-R and CD-RW, as shown in FIG. 2, a program memory area (PMA) and a power calibration area (PCA) are disposed in the region further towards the center than the lead-in area.

A program area next to the lead-in area is used for recording live data. The lead-in area and the program area are used for recording content by a drive device compatible with CD-Rs or CD-RWs, and are also used for playing back the recorded content in the same manner as CD-DAs or the like. The PMA is used for temporarily recording the mode of a recording signal and start and end time information each time a track is recorded. After recording all expected tracks, a table of contents (TOC) is formed in the lead-in area based on this recorded information. The PCA is an area for performing a test write in order to determine the optimum laser power to use during recording.

Figure 3:
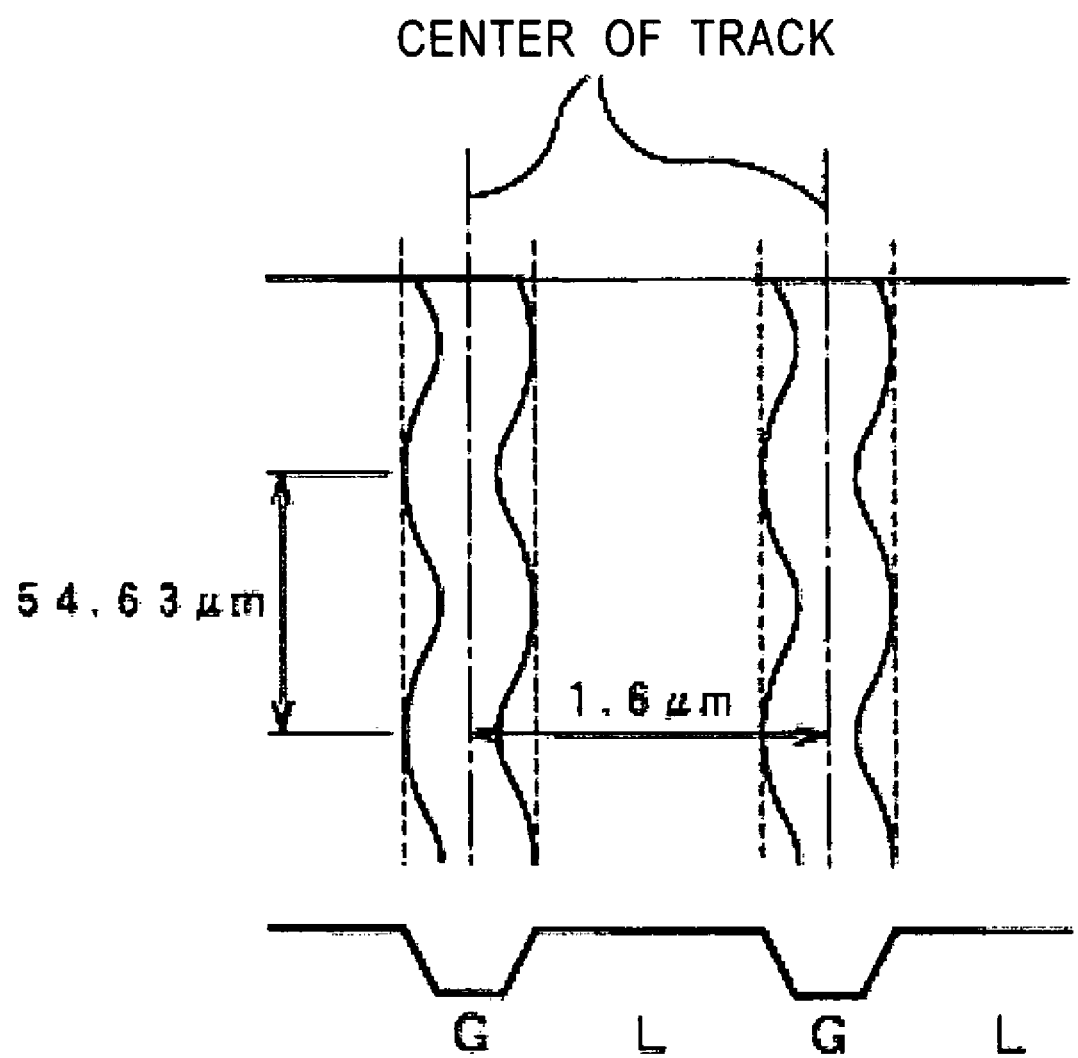
FIG. 3 is an illustration of a wobbled groove.

In a CD-R and CD-RW, a groove (guiding groove) that constitutes a data track is wobbled for determining the recording position or controlling spindle rotation. The wobbled groove is formed based on a signal that is modulated by information such as an absolute address so as to contain the information such as an absolute address. That is, the wobble information such as an absolute address can be read from the groove. The absolute time (address) information expressed by the wobbled groove is known as "absolute time in pre-groove (ATIP)". As shown in FIG. 3, the wobbled groove is wobbled in a sine wave fashion, with a center frequency of 22.05 kHz and a wobbling amount of about ±0.03 µm.

As described above, for example, a CD-DA and CD-R have different physical characteristics. In a CD-DA, no information is recorded in a region further towards the center than the lead-in area, whereas, in a CD-R, the PCA and PMA exist in a region further towards the center than the lead-in area. Moreover, in a CD-R, a wobbled groove is formed, whereas, in a CD-DA, no wobbled groove is formed.

Such physical differences are determined by an optical disc playback device based on, for example, the difference in reflectance of the reflected light. Thus, the CD-DA and CD-R of the first embodiment are distinguishable on the playback side based on the physical differences. Therefore, the user is allowed to play back content on the playback side in accordance with the CD-DA usage rights or the CD-R usage rights.

According to the optical disc of the first embodiment, therefore, copyright management is achievable without prohibiting copying. Therefore, the user can use such a disc without being inconvenienced.

In the first embodiment, CD-DA audio information is copied to a CD-R, by way of example. If CD-DA and CD-RW usage right files are provided, CD-DA audio information may be copied to a CD-RW. In this case, the user is prohibited from copying the copied audio information on the CD-RW to other media, or the user is limited to a certain period of time for using the copied audio information. Similar limitations apply to a case in which CD-DA and MD usage right files are provided.

Second Embodiment

Figure 4:
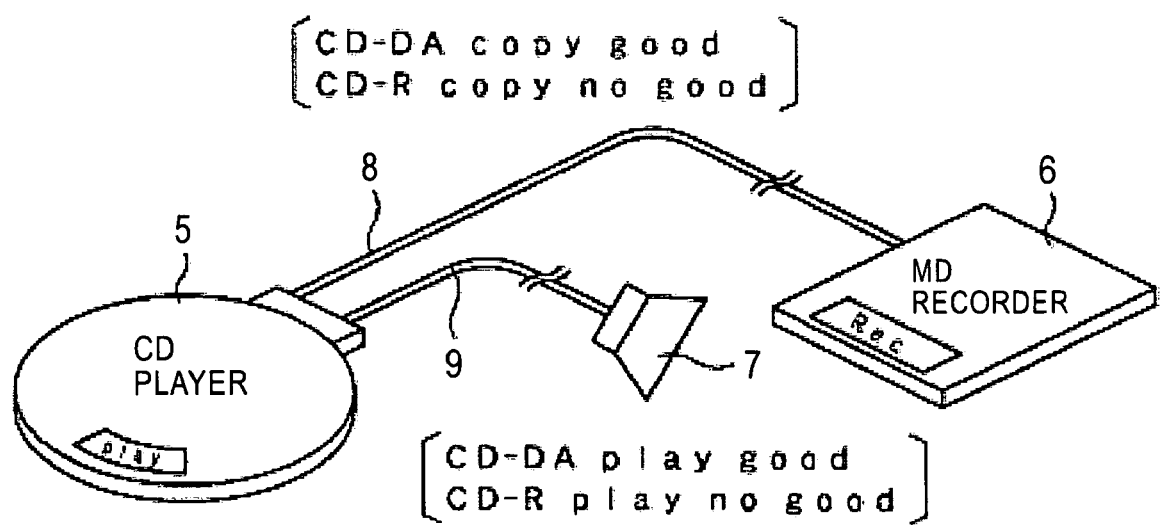
FIG. 4 is an illustration of a CD player according to a second embodiment of the present invention, which is connected to other peripheral devices.

FIG. 4 illustrates a CD player 5 according to a second embodiment of the present invention for playing back the CD-DA and CD-R of the first embodiment. In FIG. 4, the CD player 5 is connected to peripheral devices, namely, an MD recorder 6 and a speaker 7, via cables 8 and 9, respectively.

Figure 5:
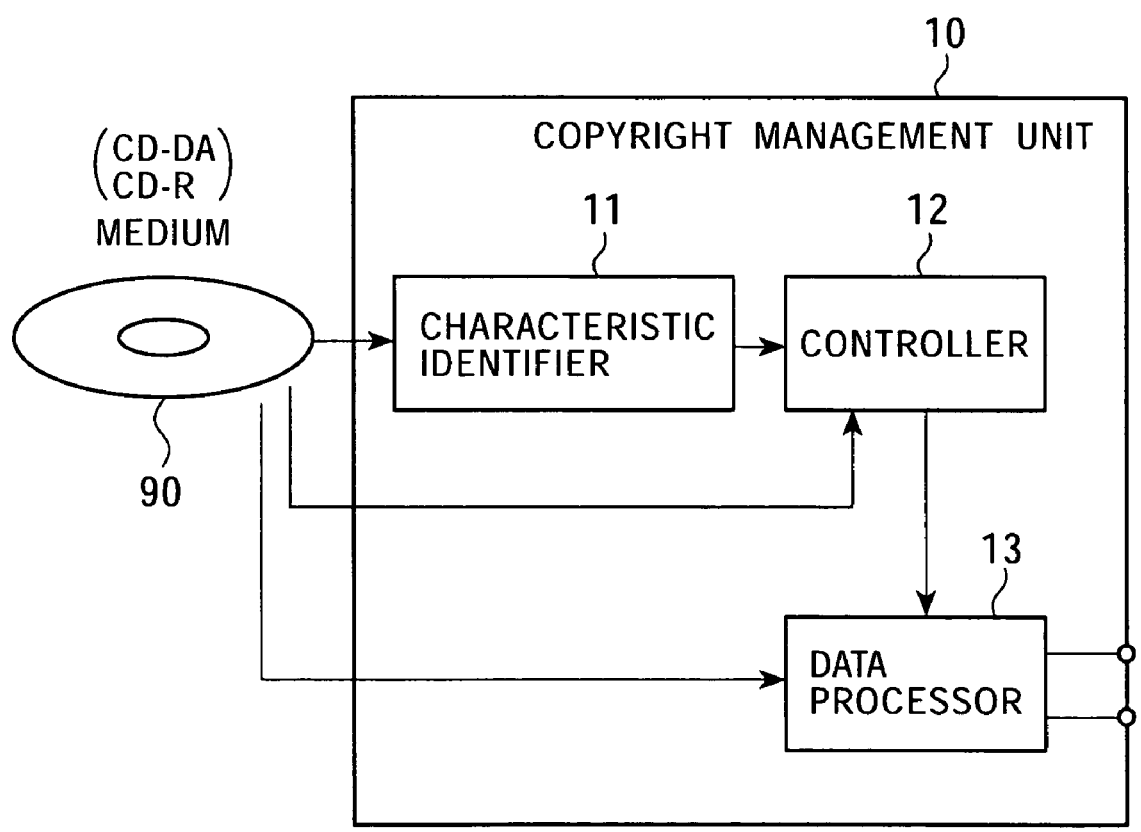
FIG. 5 is a functional block diagram of a copyright management unit of the CD player.

The CD player 5 functionally has a copyright management unit 10 shown in FIG. 5. The copyright management unit 10 includes a characteristic identifier 11 that identifies CD-DA and CD-R physical characteristics, a controller 12 that determines a medium 90 from the physical characteristics identified by the characteristic identifier 11 and that manages copyright during operations according to the usage right corresponding to the determined medium 90, and a data processor 13 that processes the information data of the medium 90 under copyright management of the controller 12.

The characteristic identifier 11 distinguishes the CD-DA and CD-R physical characteristics described above. For example, in a CD-DA, no information is recorded in a region further towards the center than the lead-in area, whereas, in a CD-R, the PCA and PMA exist in a region further towards the center than the lead-in area. When an optical pickup is moved to the radially inner periphery of the disc, the characteristic identifier 11 determines whether or not EFM data is recorded in a region further towards the center than the TOC in the lead-in area based on the difference in reflectance. Alternatively, the characteristic identifier 11 may determine whether or not a wobbled groove is formed based on the difference in reflectance.

The controller 12 reads the usage rights for two media (CD-DA and CD-R), which are recorded in predetermined regions of the medium 90, i.e., the CD-DA usage rights and the CD-R usage rights. Then, the controller 12 checks for tampering based on the digital signature attached thereto. Alternatively, a MAC using a shared secret key may be attached to the usage rights and may be used to check for tampering. The controller 12 determines whether the medium 90 is a CD-DA or CD-R based on the physical characteristics identified by the characteristic identifier 11. The controller 12 sends a control signal corresponding to the CD-DA usage rights or the CD-R usage rights depending upon the determined medium to the data processor 13. The controller 12 further obtains and sends a content key that is hidden in a secret location of the medium 90 to the data processor 13. If the content key recorded in the predetermined region of the medium 90 has been encoded, the content key is decoded using a global secret key and is then sent to the data processor 13.

The data processor 13 reads the encoded content recorded in the predetermined region of the medium 90, and decodes the encoded content using the content key sent from the controller 12. The decoded content (audio information) is processed based on the control signal corresponding to the CD-DA usage rights or CD-R usage rights supplied from the controller 12. The resulting content is output from an output terminal.

Figure 6:
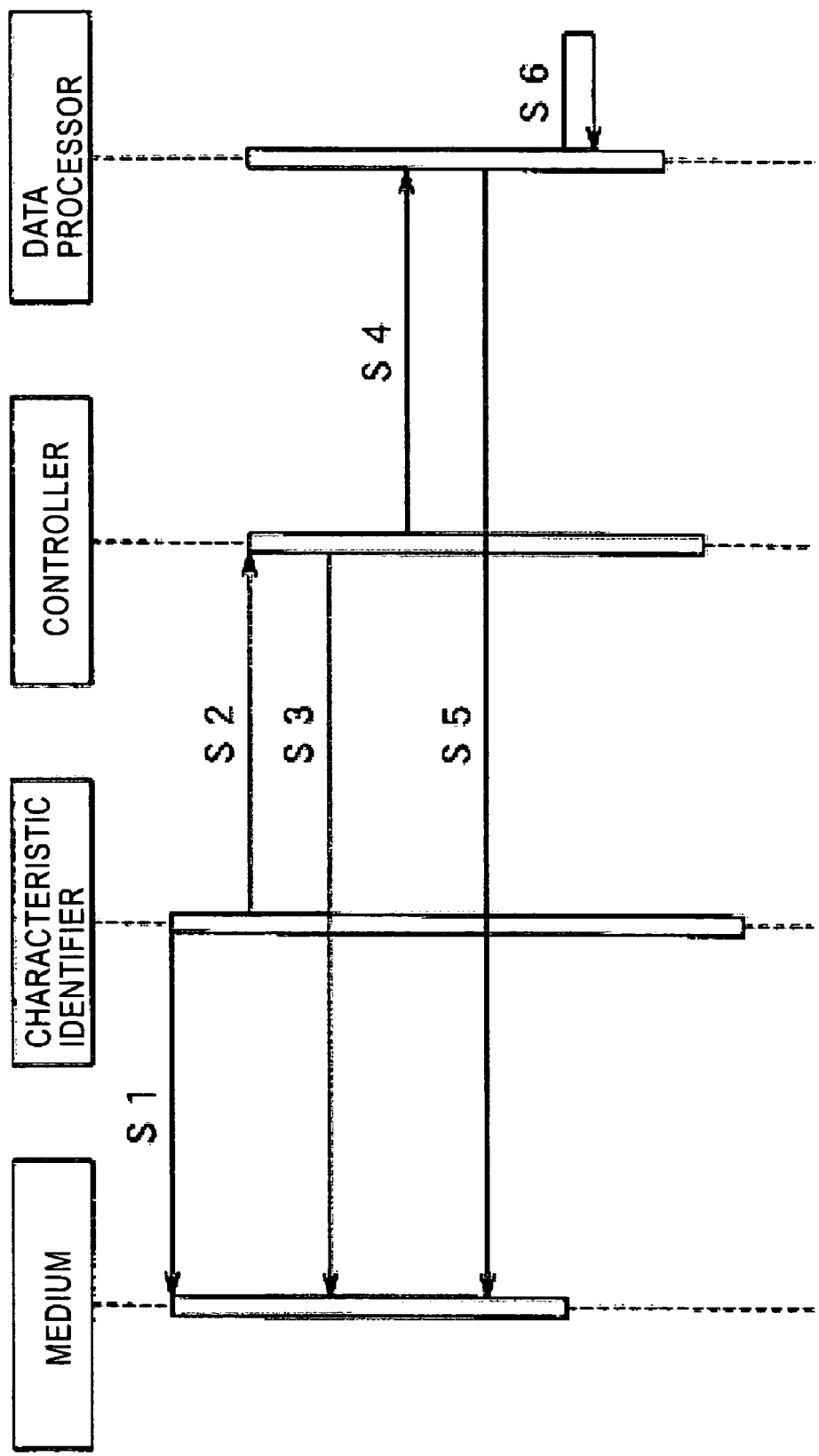
FIG. 6 is a sequence diagram showing the operation flow of the copyright management unit.

FIG. 6 shows the operation flow of the copyright management unit 10. First, the characteristic identifier 11 refers to the medium 90 (CD-DA or CD-R), and extracts a physical characteristic (step S1). Then, the characteristic identifier 11 transfers the extracted physical characteristic to the controller 12 (step S2). The controller 12 determines the type of the medium 90 based on the physical characteristic transferred in step S2. The controller 12 also reads the CD-DA usage rights and CD-R usage rights (step S3) to list the operations allowed with respect to the medium 90 in accordance with the CD-DA usage rights or the CD-R usage rights. The controller 12 transfers the allowed operations to the data processor 13 by means of a control signal (step S4).

The data processor 13 reads the encoded content from the medium 90 (step S5). The data processor 13 decodes the encoded content using the content key supplied from the controller 12. Processing, such as playback, is performed on the decoded content (audio data) under the CD-DA usage rights or CD-R usage rights in accordance with the control signal (step S6). For example, if the CD-DA usage rights or CD-R usage rights include permission to write the audio information by checkout or copying, the data processor 13 may read the audio information in step S5 and may record the read data in step S6 by the permitted operation such as checkout or copying.

Figure 7:
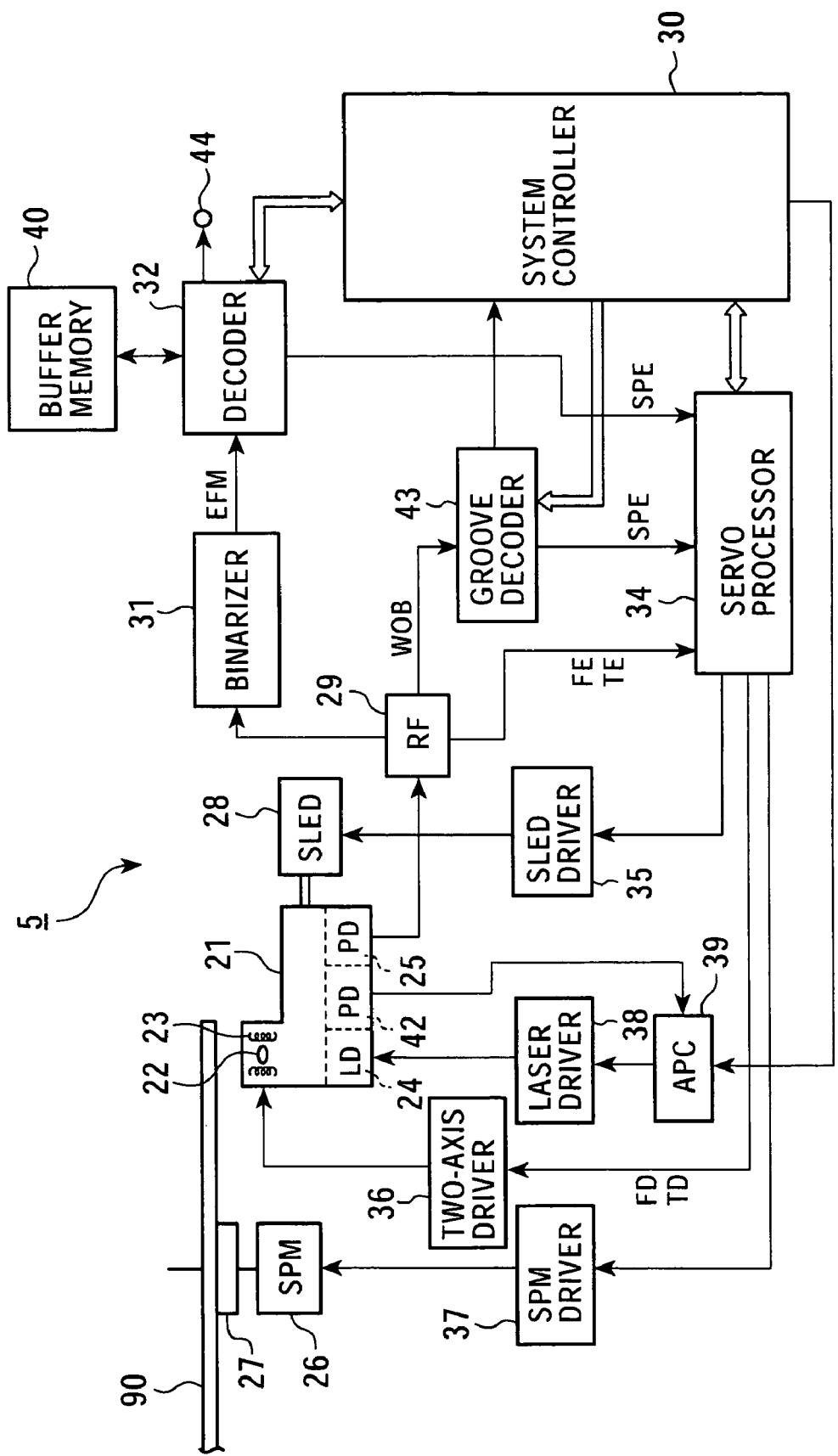
FIG. 7 is a block diagram showing the hardware configuration of the CD player.

The hardware configuration of the CD player 5 having the copyright management unit 10 functionally shown in FIG. 5 will be described with reference to FIG. 7. In FIG. 7, the medium (disc) 90 may be a CD-DA, CD-R, or the like.

The disc 90 mounted on a turntable 27 is rotated at a constant linear velocity (CLV) or constant angular velocity (CAV) by a spindle motor 26 during playback. Pit data on the disc 90 is read by an optical pickup 21. In a CD-DA or CD-ROM, embossed pits are used. In a CD-R, pits created by organic dye change (reflectance change) are used, and in a CD-RW, pits created by phase change are used.

The pickup 21 includes a laser diode 24 serving as a laser light source, a photodetector 25 for detecting reflected light, an objective lens 22 from which the laser light is output, and an optical system (not shown) that irradiates the laser light onto a recording surface of the disc 90 via the objective lens 22 and that guides the reflected light to the photodetector 25. The pickup 21 further includes a monitoring detector 42 that receives a portion of the light output from the laser diode 24.

The objective lens 22 is held so as to be movable in the tracking direction and focus direction by a two-axis mechanism 23. The overall pickup 21 is movable in the radius direction of the disc 90 by a sled mechanism 28. The laser diode 24 of the pickup 21 is driven by a driving signal (driving current) from a laser driver 38 to emit laser light.

The reflected light information from the disc 90 is detected by the photodetector 25, and is converted into an electrical signal in accordance with the amount of received light. The converted electrical signal is supplied to an RF amplifier 29.

The RF amplifier 29 includes a current-to-voltage converting circuit, a matrix operating/amplifying circuit, and so on for supporting currents output from a plurality of light receiving devices of the photodetector 25, and generates signals necessary for matrix operating. The RF amplifier 29 generates, for example, an RF signal indicating playback data, a focus error signal FE for servo control, a tracking error signal TE, and so on. The playback RF signal output from the RF amplifier 29 is supplied to a binarizing circuit 31, and the focus error signal FE and the tracking error signal TE are supplied to a servo processor 34.

As described above, if the disc 90 is a CD-R or CD-RW, the disc 90 is pregrooved for guiding a recording track, and this groove is wobbled in accordance with a signal in which time information indicating the absolute address on the disc 90 has been frequency modulated (FM). Thus, during playback, tracking servo is performed based on the groove information, and the absolute address or various types of physical information is obtained as wobble information of the groove. The RF amplifier 29 extracts wobble information WOB by matrix operating, and supplies the extracted information wobble information WOB to a groove decoder 43.

The groove decoder 43 demodulates the supplied wobble information WOB to obtain absolute-address information, and supplies it to a system controller 30. The groove information is supplied to a PLL circuit to obtain rotational velocity information of the spindle motor 26, which is compared to reference velocity information to generate a spindle error signal SPE. There are standard density and high density CD-R and CD-RW discs. The groove decoder 43 changes the decoding method depending upon the density type from the system controller 30. More specifically, the groove decoder 43 changes the matching pattern of frame syncs.

The playback RF signal obtained by the RF amplifier 29 is binarized by the binarizing circuit 31 to produce a so-called eight-to-fourteen modulation (EFM) signal, and supplies the EFM signal to a decoder 32. The decoder 32 performs decoding, including EFM demodulation, CIRC error correction, de-interleaving, and CD-ROM decoding, to produce playback data that is converted into CD-ROM format data. The decoder 32 also extracts a subcode from the data read from the disc 90, and supplies the subcode (Q data) TOC, address information, and so on to the system controller 30. The decoder 32 also generates a playback clock synchronized with the EFM signal by PLL processing, and performs the decoding described above in accordance with the playback clock. The rotational velocity information of the spindle motor 26 is obtained from the playback clock, and is compared to reference velocity information to generate a spindle error signal SPE. The decoder 32 changes the decoding method depending upon whether a standard density disc or a high density disc is to be played back.

During playback, the decoder 32 stores the decoded data in a buffer memory 40. The data buffered in the buffer memory 40 is read from the CD player 5, and is output from an output terminal 44.

An auto power control (APC) circuit 39 controls the laser output so as to be constant regardless of the temperature or the like while monitoring the laser output power using the monitoring detector 42. The target laser output value is given by the system controller 30. The APC circuit 39 controls the laser driver 38 so that the laser output level reaches this target value.

The servo processor 34 generates various servo drive signals for focus servo, tracking servo, sled servo, and spindle servo from the focus error signal FE and the tracking error signal TE from the RF amplifier 29, the spindle error signal SPE from the decoder 32 or the address decoder 40, and so on to execute servo operations. Specifically, the servo processor 34 generates a focus drive signal FD and a tracking drive signal TD based on the focus error signal FE and the tracking error signal TE, and supplies these signals to a two-axis driver 36. The two-axis driver 36 drives a focus coil and a tracking coil of the two-axis mechanism 23 in the pickup 21. Therefore, the pickup 21, the RF amplifier 29, the servo processor 34, the two-axis driver 36, and the two-axis mechanism 23 constitute a tracking servo loop and a focus servo loop.

When a track-jump command is sent from the system controller 30, the tracking servo loop is turned off, while a jump-drive signal is output to the two-axis driver 36, thereby performing a track-jump operation.

The servo processor 34 also generates a spindle drive signal based on the spindle error signal SPE, and supplies it to a spindle motor driver 37. The spindle motor driver 37 applies, for example, a three-phase drive signal to the spindle motor 26 in accordance with the spindle drive signal to activate CLV rotation or CAV rotation of the spindle motor 26. The servo processor 34 also generates a spindle drive signal based on a spindle kick/brake control signal from the system controller 30 so that the spindle motor driver 37 drives start, stop, acceleration, or deceleration of the spindle motor 26.

The servo processor 34 also generates, for example, a sled drive signal based on a sled error signal that is obtained as a low-frequency component of the tracking error signal TE or access control from the system controller 30, and supplies it to a sled driver 35. The sled driver 35 drives the sled mechanism 28 in accordance with the sled drive signal. The sled mechanism 28 includes a main shaft that holds the pickup 21, a sled motor, a transmission gear, and so on, although these parts are not shown. The sled driver 35 drives the sled motor in accordance with the sled drive signal to slide the pickup 21.

The servo and playback operations described above are controlled by the system controller 30, which is constituted by a microcomputer. In response to commands from an operation unit (not shown), the system controller 30 performs various processes. For example, when the operation unit supplies a play command for playing back data recorded in the disc 90, first, the system controller 30 seeks an address instructed by seek control. Specifically, the system controller 30 instructs the servo processor 34 that the pickup 21 should access the target address instructed by the seek command. Then, the system controller 30 performs operation control necessary for playing back the instructed data segment. That is, the required data is played back by reading data from the disc 90, decoding it, and buffering the decoded data. The system controller 30 may be connected to a display unit for displaying the track number at which data is being recorded/played back or the recording/playback time (absolute address or relative address).

Moreover, the system controller 30 functions as the characteristic identifier 11 and the controller 12 of the copyright management unit 10 shown in FIG. 5. The system controller 30 and the decoder 32 perform the function of the data processor 13. The decoder 32 extracts the encoded content, and the system controller 30 decodes the extracted content using the content key and then processes the decoded data in accordance with the corresponding usage right.

Figure 8:
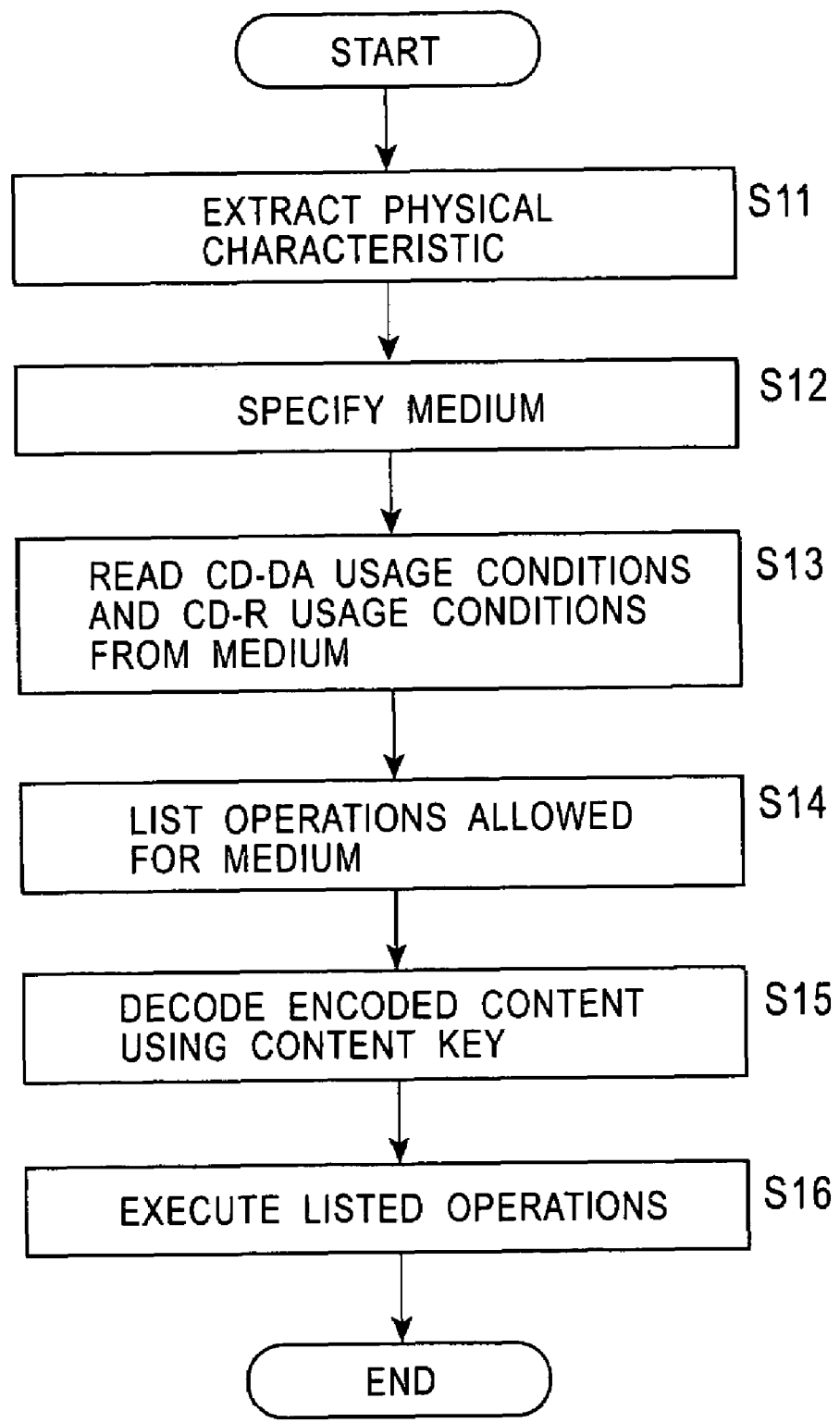
FIG. 8 is a flowchart showing the procedure of a system controller of the CD player that functions as the copyright management unit.

The operation procedure of the functions of the system controller 30 will be described with reference to FIG. 8. In step S11, the system controller 30 functions as the characteristic identifier 11 to extract a physical characteristic of the medium 90 from the data obtained via the pickup 21, the RF amplifier 29, the binarizing circuit 31, and the decoder 32. Alternatively, the system controller 30 may extract a physical characteristic of the medium 90 from the data obtained via the pickup 21, the RF amplifier 29, and the groove decoding circuit 43.

In step S12, the system controller 20 functions as the controller 12 to determine the type of the medium 90 based on the physical characteristic obtained in step S11. The medium 90 is, for example, a CD-DA or CD-R.

In step S13, the system controller 30 also functions as the controller 12 to read the CD-DA usage rights and the CD-R usage rights from the medium 90. Then, tampering is checked for based on the digital signature. Alternatively, tampering may be checked for based on a MAC having a shared secret key. In step S14, the system controller 30 also functions as the controller 12 to list the operations allowed with respect to the medium 90.

In step S15, the system controller 30 functions as the data processor 13 to decode the encoded content, which is subjected to the decoding described above by the decoder 32, using the content key. The system controller 30 extracts the content key that is secretly hidden in the medium 90, or decodes the encoded content key that is recorded in a predetermined region of the medium 90 using a global secret key.

In step S16, the system controller 30 functions as the data processor 13 to perform the operations listed in step S14 depending upon the type of the medium 90.

For example, it is assumed that the CD-R shown in FIG. 1 is mounted on the turntable 27 of the CD player 5. The system controller 30 functions as the characteristic identifier 11 to extract a CD-R physical characteristic from the reflectance of the reflected light. For example, when the system controller 30 determines that the PCA and PMA exist in a region further towards the center than the lead-in area, it functions as the controller 12 to determine that the medium 90 is a CD-R from the extracted physical characteristic.

Then, the system controller 30 functions as the controller 12 to read the CD-DA usage rights and the CD-R usage rights from the CD-R and to check for tampering. Then, the system controller 30 refers to the CD-R usage rights, and lists the operations, for example, the operations that accord permission of only playback and that do not accord permission of copying. The system controller 30 functions as the data processor 13 to perform the listed operations on the decoded content. In this case, for example, the content is only played back from the speaker 7 shown in FIG. 4 or a headphone (not shown).

For example, it is assumed that a CD-DA is mounted on the turntable 27. The system controller 30 functions as the characteristic identifier 11 to extract a CD-DA physical characteristic from the reflectance of the reflected light. For example, when the system controller 30 determines that there is no data region further towards the center than the lead-in area, it functions as the controller 12 to determine that the medium 90 is a CD-DA from the extracted physical characteristic.

Then, the system controller 30 functions as the controller 12 to read the CD-DA usage rights and the CD-R usage rights from the CD-DA and to check for tampering. Then, the system controller 30 refers to the CD-DA usage rights, and lists the operations, for example, the operations that accord permission of both playback and copying. The system controller 30 functions as the data processor 13 to perform the listed operations on the decoded content. In this case, for example, the content is played back and copied. The user is therefore allowed to copy the audio information to an MD via the MD recorder 6 shown in FIG. 4.

As described above, the CD player 5 of the second embodiment can play back information from the optical disc of the first embodiment under copyright management control without inconveniencing the user.

In the second embodiment, CD-DA audio information is copied to a CD-R, by way of example. If CD-DA and CD-RW usage right files are provided, CD-DA audio information may be copied to a CD-RW. In this case, the user is prohibited from copying the copied audio information on the CD-RW to other media, or the user is limited to a certain period of time for using the copied audio information. Similar limitations apply to a case in which CD-DA and MD usage right files are provided.

Third Embodiment

Figure 9:
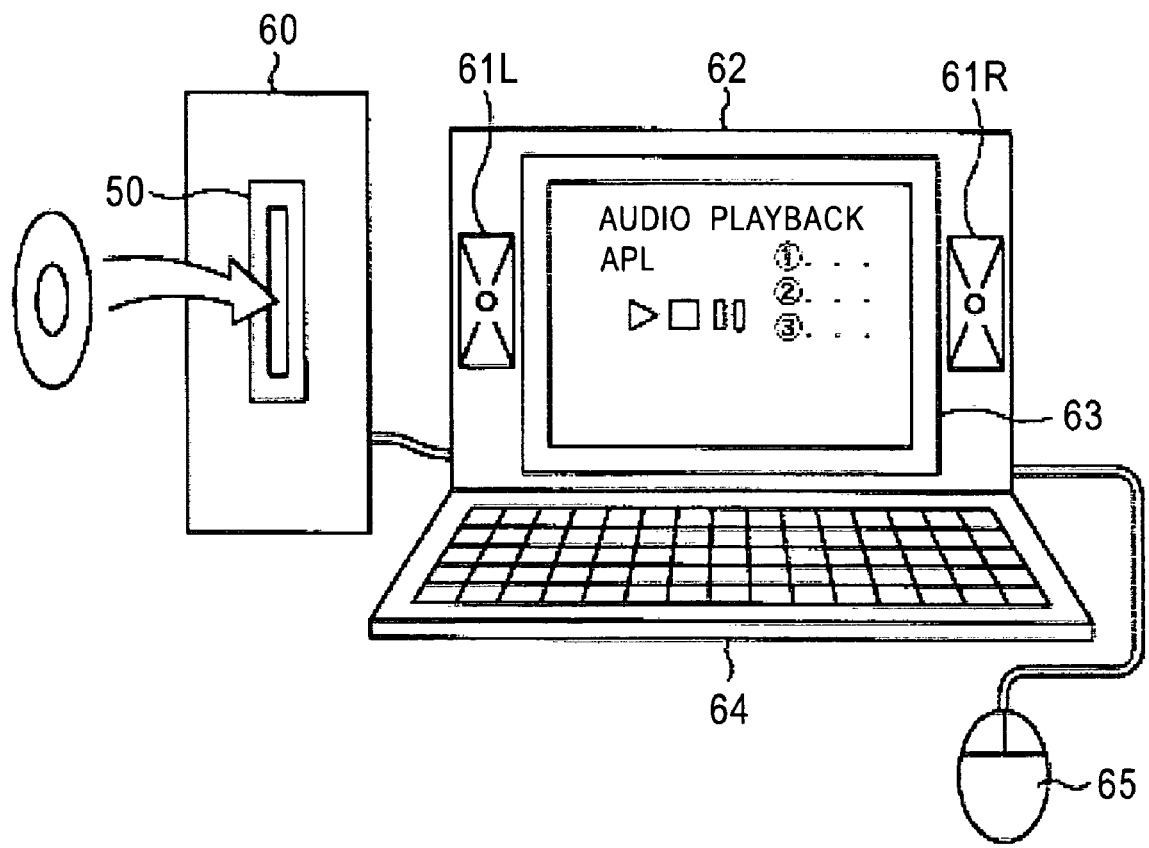
FIG. 9 is an illustration of a PC according to a third embodiment of the present invention.

FIG. 9 illustrates a personal computer (PC) according to a third embodiment of the present invention that houses an optical disc drive device 50 for playing back the CD-DA and CD-R of the first embodiment in a main body 60. The PC executes a music playback application to play back the audio information in the optical disc drive device 50 and to output the playback audio information from a set of speakers 61L and 61R disposed on either side of a liquid crystal display (LCD) 63 of a display unit 62.

Figure 10:
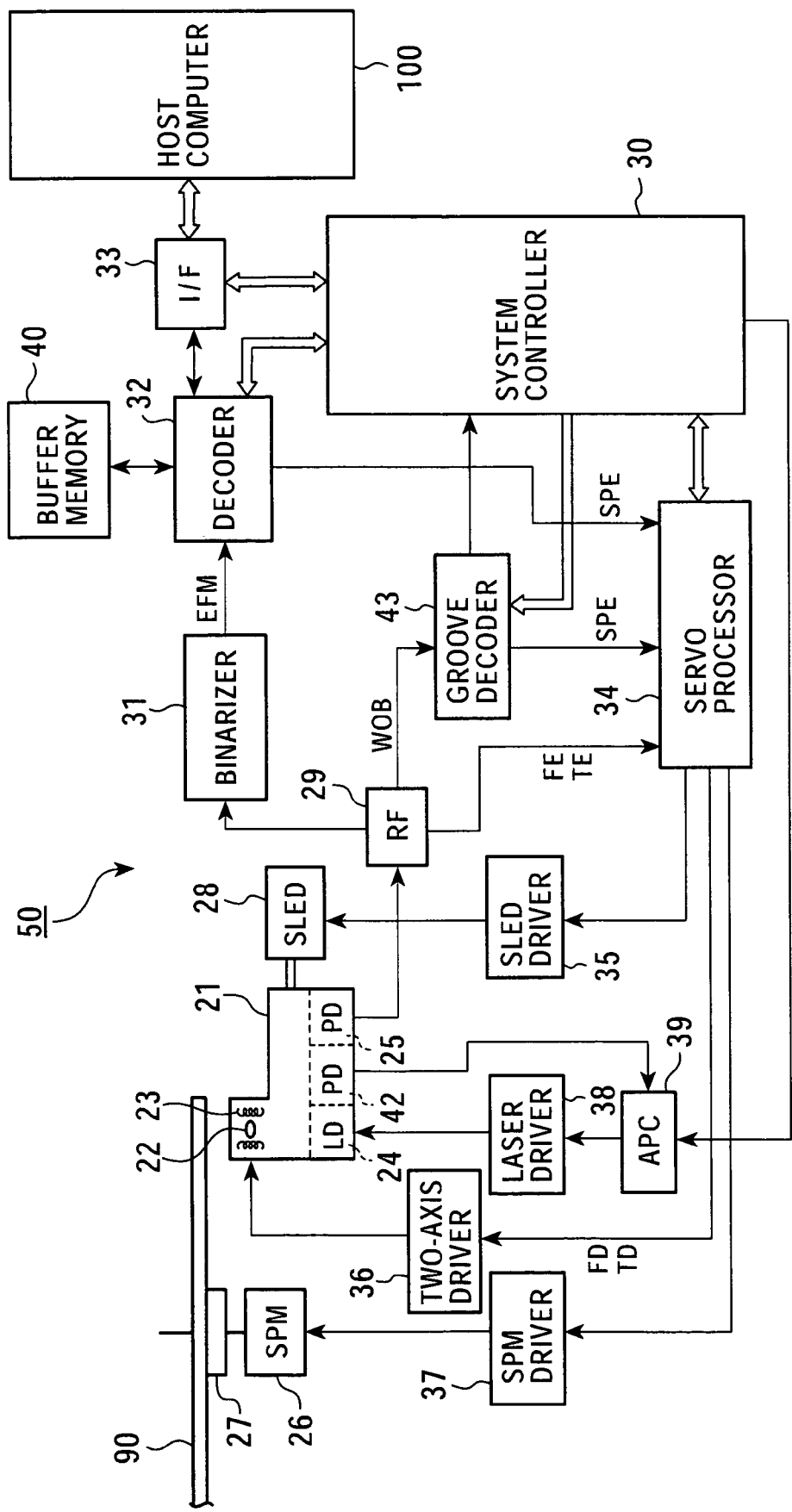
FIG. 10 is a block diagram showing the hardware configuration of an optical disc drive device that is housed in the PC according to the third embodiment.

First, the hardware configuration of the optical disc drive device 50 will be described with reference to FIG. 10, comparing to the configuration of the CD player 5 shown in FIG. 7. In FIG. 10, the disc 90 may be a CD-DA, CD-R, or the like. The difference from the configuration of the CD player 5 shown in FIG. 7 is that the data decoded by the decoding circuit 32, once stored in the buffer memory 40, is transferred to a host computer 100 via an interface 33. The interface 33 is connected with the external host computer 100 to communicate playback data or various commands with the host computer 100. The interface 33 employs a small computer system interface (SCSI) or an advanced technology attachment packet interface (ATAPI) for actual use. During playback, the playback data that is decoded and stored in the buffer memory 40 is transferred to the host computer 100 via the interface 33. A read command and other signals from the host computer 100 are supplied to the system controller 30 via the interface 33.

The system controller 30 performs various operations in accordance with commands from the host computer 100. For example, when a read command for transferring data recorded in the disc 90 is supplied from the host computer 100, the system controller 30 seeks an address instructed by the command. Specifically, the system controller 30 instructs the servo processor 34 that the pickup 21 should access the target address instructed by the seek command. Then, the system controller 30 performs operation control necessary for transferring the instructed data segment to the host computer 100. That is, the required data is transferred by reading data from the disc 90, decoding it, and buffering the decoded data.

Unlike the system controller 30 in the second embodiment, in the third embodiment, the system controller 30 does not function as the characteristic identifier 11 and the controller 12 of the copyright management unit 10 shown in FIG. 5. An audio playback application is executed by a central processing unit (CPU) of the host computer 100 to perform the functions described above, as described below.

Figure 11:
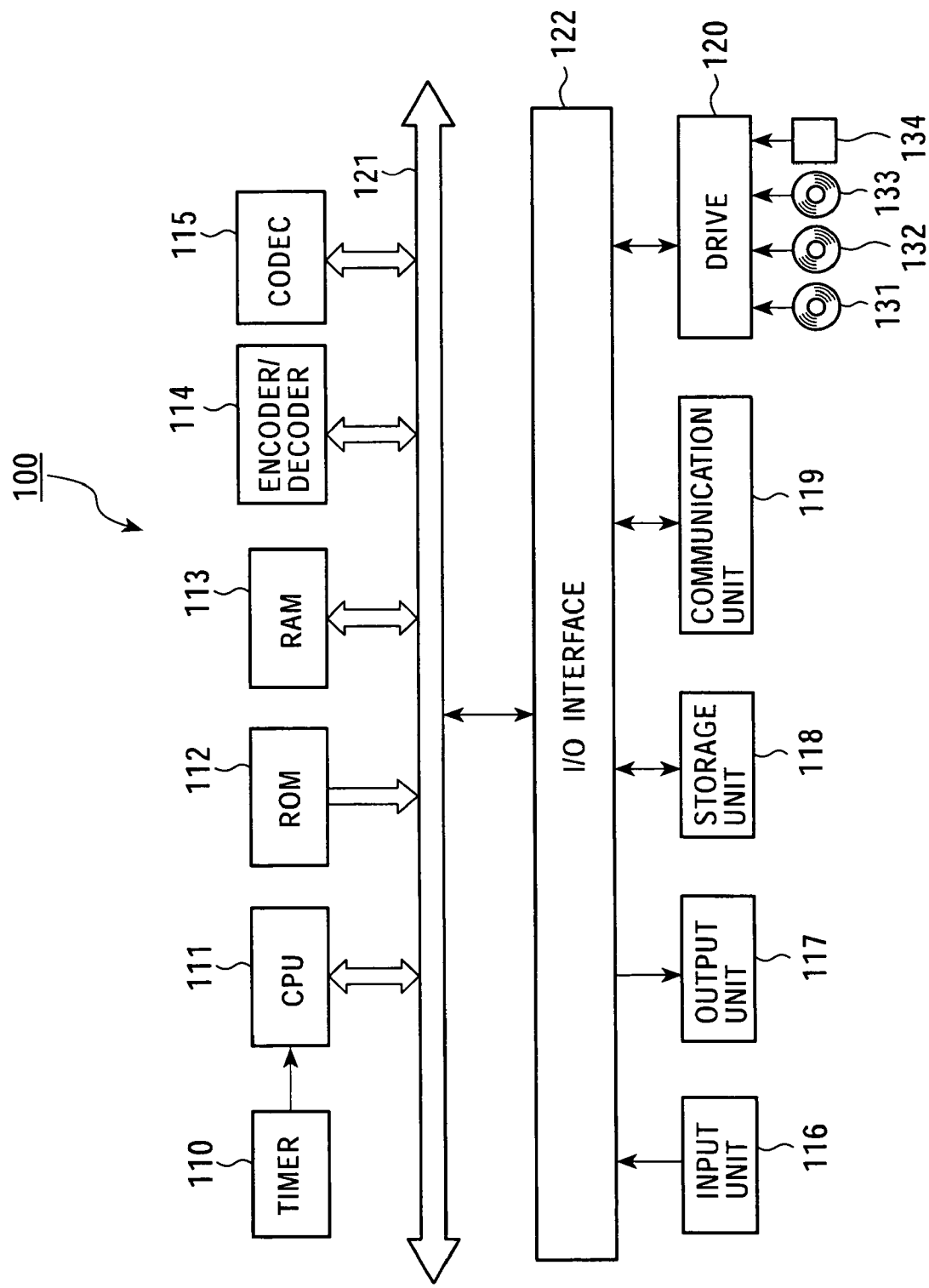
FIG. 11 is a block diagram of the PC according to the third embodiment.

The configuration of the PC 100 according to the third embodiment will now be described with reference to FIG. 11. A CPU 111 executes various processes in accordance with a program stored in a read-only memory (ROM) 112 or a program loaded from a storage unit 118 to a random access memory (RAM) 113. A timer 110 measures a time, and supplies time information to the CPU 111. The RAM 113 further stores data necessary for the CPU 111 to execute various processes, if necessary.

An encoder/decoder 114 encodes content data and decodes encoded content data. A codec 115 encodes content data using a technique such as ATRAC3 (Adaptive Transform Acoustic Coding 3), and supplies the encoded data via an input/output interface 122 to a semiconductor memory 134 that is connected to a drive 120 for recording. The codec 115 also decodes encoded data that is read from the semiconductor memory 134 via the drive 120. The semiconductor memory 134 is commercially available as a memory card.

The CPU 111, the ROM 112, the RAM 113, the encoder/decoder 114, and the codec 115 are connected with one another via a bus 121. The input/output interface 122 is also connected to the bus 121.

The input/output interface 122 is connected to an input unit 116, such as a keyboard 64 or a mouse 65 shown in FIG. 9, an output unit 117, such as the display 63 such as a cathode ray tube (CRT) or an LCD, the speaker set 61L and 61R, a storage unit 118 such as a hard disk, and a communication unit 119 such as a modem or a terminal adaptor.

The communication unit 119 performs communication via the Internet to send data from the CPU 111. The communication unit 119 also outputs data received from a communicating party to the CPU 111, the RAM 113, and the storage unit 118. The storage unit 118 communicates with the CPU 111 to store and delete information.

The drive 120 is also connected to the input/output interface 122, if necessary, and a magnetic disc 131, an optical disc 132, a magneto-optical disc 133, the semiconductor memory 134, or the like is mounted to the drive 120, as desired. A computer program read from such a mounted disc or the like is installed in the storage unit 118, if necessary. The optical disc drive device 50 of the second embodiment corresponds to a portion of the drive 120, and the optical disc 132 corresponds to a CD-DA or CD-R.

The audio playback application is stored in the storage unit 118, and is loaded by the CPU 111 to the RAM 113 when a start command is sent from the keyboard or mouse of the input unit 116.

By executing the audio playback application, the CPU 111 achieves the functions of the copyright management unit 10 shown in FIG. 5. The functional configuration and processing of the components of the copyright management unit 10 are not described herein. By executing the audio playback application, the CPU 111 also achieves the operation flow of the copyright management unit 10 shown in FIG. 5.

The operation procedure of the functions of the CPU 111 of the host computer 100 will be described with reference to FIG. 8. In step S11, the CPU 111 functions as the characteristic identifier 11 shown in FIG. 5 to extract a physical characteristic of the medium 90 from the data obtained via the pickup 21, the RF amplifier 29, the binarizing circuit 31, the decoder 32, and the interface 33. Alternatively, the CPU 111 may extract a physical characteristic of the medium 90 from the data obtained via the pickup 21, the RF amplifier 29, the groove decoding circuit 43, the system controller 30, and the interface 33.

In step S12, the CPU 111 functions as the controller 12 to determine the type of the medium 90 based on the physical characteristic obtained in step S11. The medium 90 is, for example, a CD-DA or CD-R.

In step S13, the CPU 111 also functions as the controller 12 to read the CD-DA usage rights and the CD-R usage rights from the medium 90. Then, tampering is checked for based on the digital signature attached thereto. Alternatively, tampering may be checked for based on a MAC having a shared secret key. In step S14, the CPU 111 further functions as the controller 12 to lists the operations allowed with respect to the medium 90.

In step S15, the CPU 111 functions as the data processor 13 to decode the encoded content, which is subjected to the decoding described above by the decoder 32, using the content key. The CPU 111 extracts the content key that is secretly hidden in the medium 90, or decodes the encoded content key that is recorded in a predetermined region of the medium 90 using a global secret key.

In step S16, the CPU 111 functions as the data processor 13 to perform the operations listed in step S14 depending upon the type of the medium 90.

For example, it is assumed that the CD-R shown in FIG. 1 is mounted on the turntable 27 of the optical disc drive device 50. The CPU 111 functions as the characteristic identifier 11 to extract a CD-R physical characteristic from the reflectance of the reflected light. For example, when the CPU 111 determines that the PCA and PMA exist in a region further towards the center than the lead-in area, it functions as the controller 12 to determine that the medium 90 is a CD-R from the extracted physical characteristic.

Then, the CPU 111 functions as the controller 12 to read the CD-DA usage rights and the CD-R usage rights from the CD-R and to check for tampering. Then, the CPU 111 refers to the CD-R usage rights, and lists the operations, for example, the operations that accord permission of only playback and that do not accord permission of copying. The CPU 111 functions as the data processor 13 to perform the listed operations on the decoded content. In this case, for example, the content is only played back from the speaker set 61L and 61R or a headphone (not shown).

For example, it is assumed that a CD-DA is mounted on the turntable 27. The CPU 111 functions as the characteristic identifier 11 to extract a CD-DA physical characteristic from the reflectance of the reflected light. For example, when the CPU 111 determines that there is no data region further towards the center than the lead-in area, it functions as the controller 12 to determine that the medium 90 is a CD-DA from the extracted physical characteristic.

Then, the CPU 111 functions as the controller 12 to read the CD-DA usage rights and the CD-R usage rights from the CD-DA and to check for tampering. Then, the CPU 111 refers to the CD-DA usage rights, and lists operations, for example, the operations that accord permission of both playback and copying. The CPU 111 functions as the data processor 13 to perform the listed operations on the decoded content. In this case, for example, the content is played back and copied. The user is therefore allowed to copy the audio information to the magneto-optical disc 133 via the drive 120.

Figure 12:
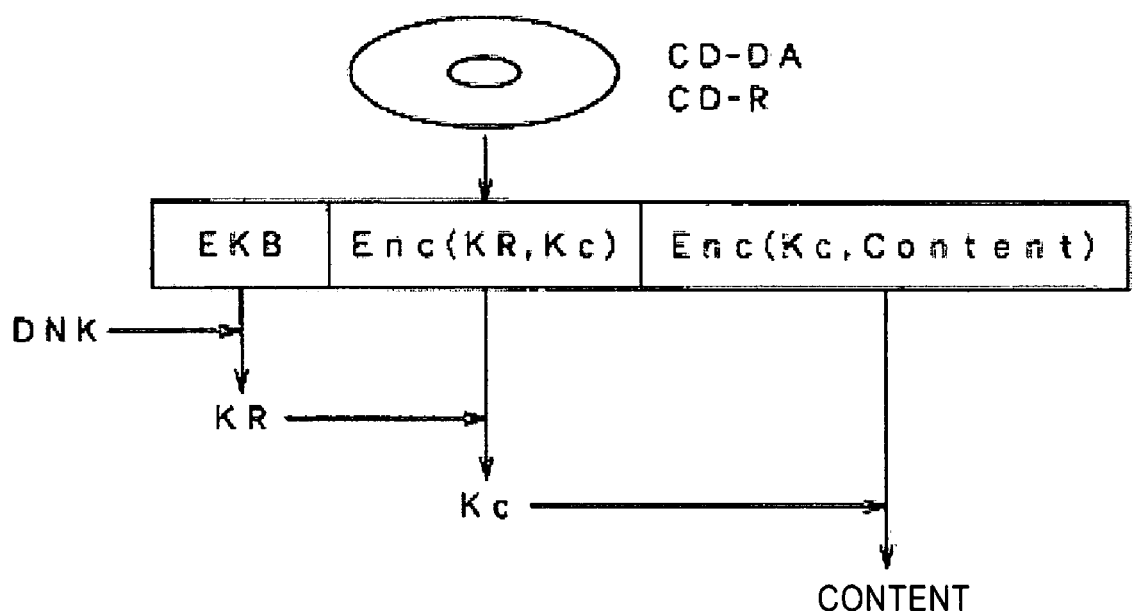
FIG. 12 is a diagram of a content key and encoded content.

Specific example of content that is encoded using a content key will now be described. In this specific example, as shown in FIG. 12, content is encoded using a content key Kc (Enc (Kc, Content)). The content key Kc, a root key KR that is encoded by an enabling key block EKB (Enc(KR, Kc)), and the enabling key block EKB are attached to the encoded content.

The enabling key block EKB shown in FIG. 12 includes, for example, the root key KR that is encoded using a device node key DNK (Enc(DNK, KR)). The CPU 111 of the PC 100 uses the device node key DNK distributed in advance to obtain the root key KR from the enabling key block EKB. The content key Kc (Enc(KR, Kc)) is decoded using the root key KR. The encoded content (Enc(Kc, Content)) is decoded using the content key Kc.

As described above, the PC 100 of the third embodiment can play back information from the optical disc of the first embodiment under copyright management control without inconveniencing the user.

In the third embodiment, CD-DA audio information is copied to a CD-R, by way of example. If CD-DA and CD-RW usage right files are provided, CD-DA audio information may be copied to a CD-RW. In this case, the user is prohibited from copying the copied audio information on the CD-RW to other media, or the user is limited to a certain period of time for using the copied audio information. Similar limitations apply to a case in which CD-DA and MD usage right files are provided.

Fourth Embodiment

Figure 13:
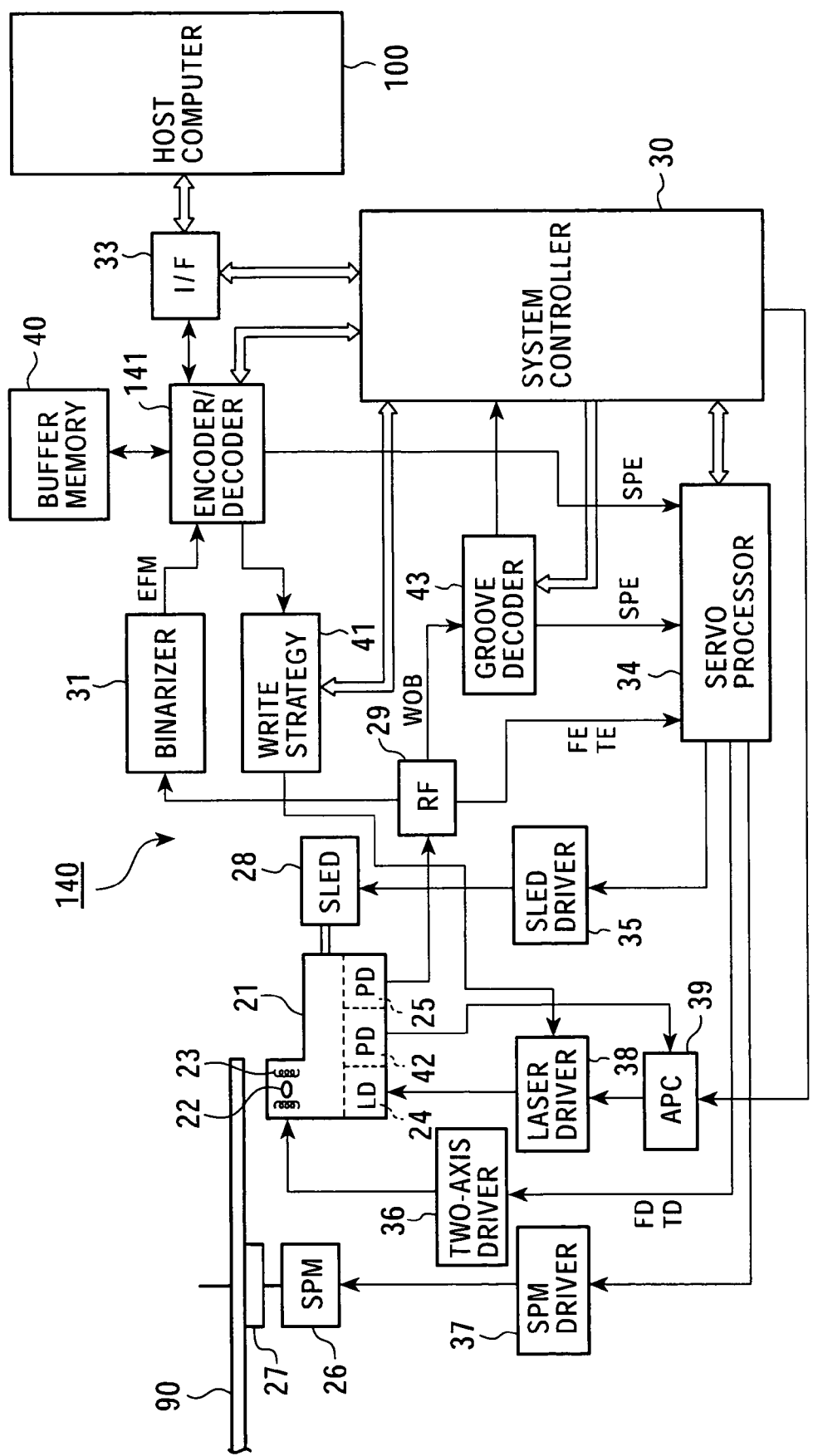
FIG. 13 is a block diagram showing the hardware configuration of an optical disc drive device that is housed in a PC according to a fourth embodiment of the present invention.

A personal computer (PC) according to a fourth embodiment of the present invention houses an optical disc drive device 140 shown in FIG. 13 that plays back the CD-DA and CD-R of the first embodiment and that records audio information to a CD-R or CD-RW. The PC executes a music recording and playback application to play back the audio information in the optical disc drive device 140 and to output the playback audio information from a set of speakers 61L and 61R disposed on either side of the LCD 63 of the display unit 62. This application is executed to play back the audio information to write the playback audio information to an internal storage device, such as an HDD, as CD-ROM data or the like and to record the written audio information to a CD-R, CD-RW, or the like.

First, the hardware configuration of the optical disc drive device 140 will be described with reference to FIG. 13. In FIG. 13, the disc 90 may be a CD-DA, CD-R, or the like. The difference from the configuration of the optical disk drive device 50 shown in FIG. 10 is that a recording system is additionally provided.

During recording, recording data (audio data or CD-ROM data) is transferred from a host computer 100. The recording data is sent from an interface 33 to a buffer memory 40 for buffering. An encoder/decoder 141 encodes the buffered recording data to convert the CD-ROM format data into CD format data (if the supplied data is CD-ROM data), and performs processing such as CIRC encoding, interleaving, subcode adding, and EFM modulation.

The EFM signal obtained by encoding in the encoder/decoder 141 is waveform-adjusted in a write strategy unit 41, and is then sent to a laser driver 38 as a laser drive pulse (write data WDATA). The write strategy unit 41 performs recording compensation. That is, the write strategy unit 41 finely adjusts the optimum recording power for characteristics of the recording layer, the laser beam spot configuration, the recording linear velocity, and so on, or adjusts the laser drive pulse waveform.

The laser driver 38 sends the laser drive pulse supplied as the write data WDATA to a laser diode 24 so as to emit laser light. Thus, pits (phase change pits or dye change pits) are formed in the disc 90 in accordance with the EFM signal.

The recording process of the system controller 30 will now be described. When a write command is sent from the host computer 100, the system controller 30 moves the pickup 21 to a target address to be written. The encoder/decoder 141 encodes the data transferred from the host computer 100 in the manner described above to produce an EFM signal. When the write data WDATA is supplied from the write strategy unit 41 to the laser driver 38, recording is performed.

The configuration and operation other than the recording system are the same as those in the second embodiment, and a description thereof is thus omitted. A description of the operation procedure of the functions of the CPU 111 of the host computer 100 is also omitted.

If the CD-DA usage rights or the CD-R usage rights indicates that the user is allowed to record audio data to other media such as a CD-R and CD-RW by checkout or copying, the recording system and the host computer 100 cause the audio data, once written to the storage unit 118 of the host computer 100, to be recorded to a medium mounted on the turntable 27, such as a CD-R or CD-RW. In this case, the usage rights for media, such as CD-DA usage rights and CD-R usage rights and/or CD-RW usage rights, are also recorded in predetermined regions. The CD-RW usage rights have been previously recorded in a medium whose data is recordable to a CD-RW.

As described above, the PC of the fourth embodiment can record and play back audio information on the optical disc of the first embodiment under copyright management control without inconveniencing the user.

In the fourth embodiment, CD-DA audio information is copied to a CD-R, by way of example. If CD-DA and CD-RW usage right files are provided, CD-DA audio information may be copied to a CD-RW. In this case, the user is prohibited from copying the copied audio information on the CD-RW to other media, or the user is limited to a certain period of time for using the copied audio information. Similar limitations apply to a case in which CD-DA and MD usage right files are provided.

In the first to fourth embodiments, the medium is determined based on a physical characteristic indicating whether or not a data region or groove exists in a region further towards the center than the lead-in area. The medium may be determined based on other physical characteristics; for example, whether or not it is a CD having information recorded in a burst cutting area, whether or not it is a CD having a specific-device-readable pattern, and so on.

In the first to fourth embodiments, the recording medium is implemented as an optical disc such as a CD-DA or CD-R, by way of example. The recording medium according to the present invention may be implemented as an HD or a semiconductor memory. For example, encoded content, a content key, and usage rights for media may be recorded in a semiconductor memory. The usage rights may include HD usage rights on the premise that the content is copied to an HD. The usage rights may also include usage rights for optical discs or other recording media on the premise that the content is copied to such media.

A semiconductor memory playback apparatus that is an implementation of the information playback apparatus according to the present invention is used to play back data that is recorded in such a semiconductor memory. Although the structure is not shown in detail, the semiconductor memory playback apparatus may include the copyright management unit 10 shown in FIG. 5, thus achieving the same advantages as those of the second to fourth embodiments.

The present invention may also be applied to recording media such as a semiconductor memory and an HD. The content recorded in such recording media may include audio information and video information. The content may also include audio information having a link to video information. According to the present invention, music content downloaded from a server to a client over a network such as the Internet may include encoded content, a content key, and usage rights for media. In this case, the client functions as the information playback apparatus and the information recording and playback apparatus of the present invention.

The characteristic identifier 11 of the copyright management unit 10 shown in FIG. 5 may extract not only a physical characteristic but also a logical characteristic of a disc, and may send the extracted characteristics to the controller 12 to determine the disc.

What is claimed is:

1. A recording medium configured to be accessed by a recording/reproducing apparatus, comprising:
    an encoding key;
    encoded information that is encoded using the encoding key; and
    at least two usage right files each having usage rights corresponding to a respective one of two physically distinct media types,
    wherein the encoding key, the encoded information, and the at least two usage right files are recorded in predetermined regions of the recording medium, and a physically distinct property of the recording medium is detected by the presence of eight-to-fourteen modulation (EFM) data in a region further towards the center than the table of content (TOC) in the lead-in area by the recording/reproducing apparatus for determining which of the two physically distinct media types corresponds to the recording medium, the recording/reproducing apparatus selecting the corresponding usage right file of the at least two usage right files to manage reproduction of the encoded information.

2. An information playback apparatus that plays back information from a recording medium, the recording medium including an encoding key, encoded information that is encoded using the encoding key, and at least two usage right files each having usage rights corresponding to a respective one of two physically distinct media types, wherein the encoding key, the encoded information, and the at least two usage right files are recorded in predetermined regions of the recording medium, said information playback apparatus comprising:
    characteristic identifying means for extracting a physically distinct property by detecting the presence of eight-to-fourteen (EFM) data in a region further towards the center than the table of contents (TOC) in the lead-in area of the recording medium;
    controlling means for determining which of the two physically distinct media types corresponds to the recording medium based on the physically distinct property and for generating a control signal for the usage right file of the at least two usage right files corresponding to the determined medium; and
    information processing means for processing the encoded information based on the control signal generated by the controlling means.

3. An information playback apparatus according to claim 2, wherein the controlling means obtains the encoding key from the recording medium and transfers the encoding key to the information processing means.

4. An information playback apparatus according to claim 3, wherein the information processing means decodes the encoded information using the encoding key, and processes the information based on the control signal.

5. An information playback apparatus according to claim 2, wherein the controlling means reads the usage rights from the recording medium.

6. An information playback apparatus according to claim 5, wherein the controlling means checks for tampering based on the usage rights.

7. An information playback apparatus according to claim 2, wherein the characteristic identifying means for extracting a physically distinct property further detects the presence of a wobbled groove of the recording medium.

8. An information playback method for playing back information from a recording medium, an encoding key; encoded information that is encoded using the encoding key; and at least two usage right files each having usage rights corresponding to a respective one of two physically distinct media types, wherein the encoding key, the encoded information, and the at least two usage right files are recorded in predetermined regions of the recording medium, said information playback method comprising:
  extracting a physically distinct property by detecting the presence of eight-to-fourteen (EFM) data in a region further towards the center than the table of contents (TOC) in the lead-in area of the recording medium;
  determining which of the two physically distinct media types corresponds to the recording medium based on the physically distinct property and generating a control signal for the usage right file of the at least two usage right files corresponding to the determined medium; and
  processing the encoded information based on the control signal generated.

9. An information recording and playback apparatus that plays back information from a recording medium and that records information to another recording medium, the recording medium including an encoding key; encoded information that is encoded using the encoding key; and at least two usage right files each having usage rights corresponding to a respective one of two physically distinct media types, wherein the encoding key, the encoded information, and the at least two usage right files are recorded in predetermined regions of the recording medium, said information recording and playback apparatus comprising:
  characteristic identifying means for extracting a physically distinct property by detecting the presence of eight-to-fourteen (EFM) data in a region further towards the center than the table of contents (TOC) in the lead-in area of the recording medium;
  controlling means for determining which of the two physically distinct media types corresponds to the recording medium based on the physically distinct property and for generating a control signal for the usage right file of the at least two usage right files corresponding to the determined medium; and
  information processing means for playing back the encoded information and recording the encoded information to another recording medium based on the control signal generated by the controlling means.

10. An information recording and playback apparatus according to claim 9, wherein the controlling means obtains the encoding key from the recording medium and transfers the encoding key to the information processing means.

11. An information recording and playback apparatus according to claim 10, wherein the information processing means decodes the encoded information using the encoding key, and processes the information based on the control signal.

12. An information recording and playback apparatus according to claim 9, wherein the controlling means reads the usage rights from the recording medium.

13. An information recording and playback apparatus according to claim 12, wherein the controlling means checks for tampering based on the usage rights.

* * * * *